(12) United States Patent
Guo et al.

(10) Patent No.: US 7,764,054 B1
(45) Date of Patent: Jul. 27, 2010

(54) VOLTAGE REGULATOR WITH CURRENT-MODE DUAL-EDGE WIDTH MODULATION AND NON-LINEAR CONTROL

(75) Inventors: Yigang Guo, Cupertino, CA (US); Francesco Carobolante, Danville, CA (US)

(73) Assignee: Fairchild Semiconductor Corporation, South Portland, ME (US)

( * ) Notice: Subject to any disclaimer, the term of this patent is extended or adjusted under 35 U.S.C. 154(b) by 136 days.

(21) Appl. No.: 12/124,953

(22) Filed: May 21, 2008

(51) Int. Cl.
G05F 1/16 (2006.01)
G05F 1/00 (2006.01)

(52) U.S. Cl. .................... 323/224; 323/283; 323/285

(58) Field of Classification Search ............... 323/224, 323/283, 285
See application file for complete search history.

(56) References Cited

U.S. PATENT DOCUMENTS

| | | | |
|---|---|---|---|
| 4,243,975 A | 1/1981 | Masuda et al. | |
| 5,852,415 A | 12/1998 | Cotter et al. | |
| 6,226,419 B1 | 5/2001 | Lodwick et al. | |
| 6,320,426 B1 | 11/2001 | Shih | |
| 6,459,335 B1 | 10/2002 | Darmawaskita et al. | |
| 6,535,061 B2 | 3/2003 | Darmawaskita et al. | |
| 6,683,441 B2 | 1/2004 | Schiff et al. | |
| 6,897,640 B2 * | 5/2005 | Nebon et al. | 323/282 |
| 6,965,223 B1 * | 11/2005 | MacLean et al. | 323/284 |
| 7,045,992 B1 * | 5/2006 | Silva et al. | 323/222 |
| 7,064,528 B2 | 6/2006 | Jochum et al. | |
| 7,064,693 B1 | 6/2006 | Huang et al. | |
| 7,133,751 B2 | 11/2006 | Kurd et al. | |
| 7,135,836 B2 | 11/2006 | Kutkut et al. | |
| 7,157,924 B2 | 1/2007 | Muhtaroglu et al. | |
| 7,158,395 B2 | 1/2007 | Deng et al. | |
| 7,164,275 B2 | 1/2007 | Gasperi | |
| 7,170,765 B2 | 1/2007 | Huang | |
| 7,180,919 B2 | 2/2007 | Kurusu | |
| 7,202,646 B2 | 4/2007 | Vinciarelli | |
| 7,225,349 B2 | 5/2007 | Tam et al. | |

(Continued)

FOREIGN PATENT DOCUMENTS

EP 1 691 473 A2 8/2006

OTHER PUBLICATIONS

8-Bit Programmable 2-to 4- Phase Synchronous Buck Controller, Apr. 12, 2006, pp. 1-32, Preliminary Technical Data, ADP3192, 2004 Analog Devices, Inc. All rights reserved.

(Continued)

*Primary Examiner*—Shawn Riley
(74) *Attorney, Agent, or Firm*—Okamoto & Benedicto LLP

(57) ABSTRACT

A voltage regulator with current-mode, dual-edge pulse width modulation (PWM) and non-linear control. The voltage regulator may include a top switch (e.g., MOSFET) configured to couple a power supply supplying an input voltage to a load. A linear control circuit of the regulator may use a first ramp signal to control turning ON of the top switch and a second ramp signal to control turning OFF of the top switch. A non-linear control circuit may turn ON the top switch upon detection of a load current step-up change to maintain an output voltage of the regulator within its regulation band. The non-linear control circuit may turn OFF the top switch upon a load current step-down change to prevent output voltage overshoot.

20 Claims, 14 Drawing Sheets

U.S. PATENT DOCUMENTS

| | | | |
|---|---|---|---|
| 7,248,082 | B2 | 7/2007 | Nakasha et al. |
| 7,256,089 | B2 | 8/2007 | List et al. |
| 7,274,181 | B2 | 9/2007 | Schrom et al. |
| RE39,976 | E | 1/2008 | Schiff et al. |
| 7,339,357 | B2 | 3/2008 | Lopata |
| 7,372,241 | B1 * | 5/2008 | Tomiyoshi ............... 323/288 |
| 7,498,792 | B2 * | 3/2009 | Chang et al. ............. 323/288 |
| 7,615,982 | B1 * | 11/2009 | Guo ........................ 323/285 |
| 7,626,372 | B2 * | 12/2009 | Yang ....................... 323/285 |

OTHER PUBLICATIONS

Forghani-Zadeh, H.S, et al., "Current-Sensing Techniques for DC-DC Converters", Published 2002, pp. 1-4, IEEE, Georgia Tech Analog Consortium, Georgia Institute of Technology, Atlanta, GA.

"8-Bit Programmable 2 to 4 Phase Synchronous Buck Controller", Apr. 2006, pp. 1-6, FAN5032 Rev. 1.0.0, Fairchild Semiconductor Corporation.

"8-Bit Programmable, 2- to 3- Phase Synchronous Buck Controller", Jan. 2007, pp. 1-39, FAN5033 Rev. 1.0.0, Fairchild Semiconductor Corporation.

"8-Bit Programmable 2- to 3- Phase Synchronous Buck Controller", Jan. 2007, pp. 1-3, FAN5029 Rev. 1.1.3, Fairchild Semiconductor Corporation.

"6-Bit VID Controller 2-4 Phase VRM 10.X Controller", Jan. 5, 2004, pp. 1-30, FAN5019 Rev. 1.0.7, Fairchild Semiconductor Corporation.

"8-Bit Programmable, 2 to 4 Phase, Synchronous Buck Controller", Mar. 2006, pp. 1-3, FAN5031 Rev. 1.0.1, Fairchild Semiconductor Corporation.

* cited by examiner

US 7,764,054 B1

VOLTAGE REGULATOR WITH CURRENT-MODE DUAL-EDGE WIDTH MODULATION AND NON-LINEAR CONTROL

BACKGROUND OF THE INVENTION

1. Field of the Invention

The present invention relates generally to electrical circuits, and more particularly but not exclusively to voltage regulators.

2. Description of the Background Art

A voltage regulator generates a regulated output voltage VOUT from an input voltage VIN. Ideally, the voltage regulator maintains the output voltage VOUT within regulation despite varying load current. However, this is not always the case in real world conditions. One instance is when the load current is varying at high slew rates and high repetition rates, which may be as much as 1000 A/μs slew rate and up to 1 MHz repetition rate. For example, a microprocessor waking out of "sleep" mode may activate a large number of dormant circuits, resulting in a large step change in load current within a relatively short period of time. As another example, the current drawn by a microprocessor may toggle at high repetition rates when running video games. In these cases, the regulator may not be able to respond fast enough to maintain the output voltage VOUT within regulation.

SUMMARY

In one embodiment, a voltage regulator employs current-mode, dual-edge pulse width modulation and non-linear control. The voltage regulator may include a top switch (e.g., MOSFET) configured to couple a power supply supplying an input voltage to a load. A linear control circuit of the regulator may use a first ramp signal to control turning ON of the top switch and a second ramp signal to control turning OFF of the top switch. The first ramp signal and the second ramp signal are out of phase. A load current detector may detect a step change of load current drawn by the load. When the step change is a step-up change, the non-linear control circuit may turn ON the top switch in between control by the linear control circuit to maintain an output voltage of the regulator within its regulation band. The non-linear control circuit may use the first ramp signal to detect the step-up change. When the step change is a step-down change, the non-linear control circuit may turn OFF the top switch to prevent output voltage overshoot.

These and other features of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

In the present disclosure, numerous specific details are provided, such as examples of circuits, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
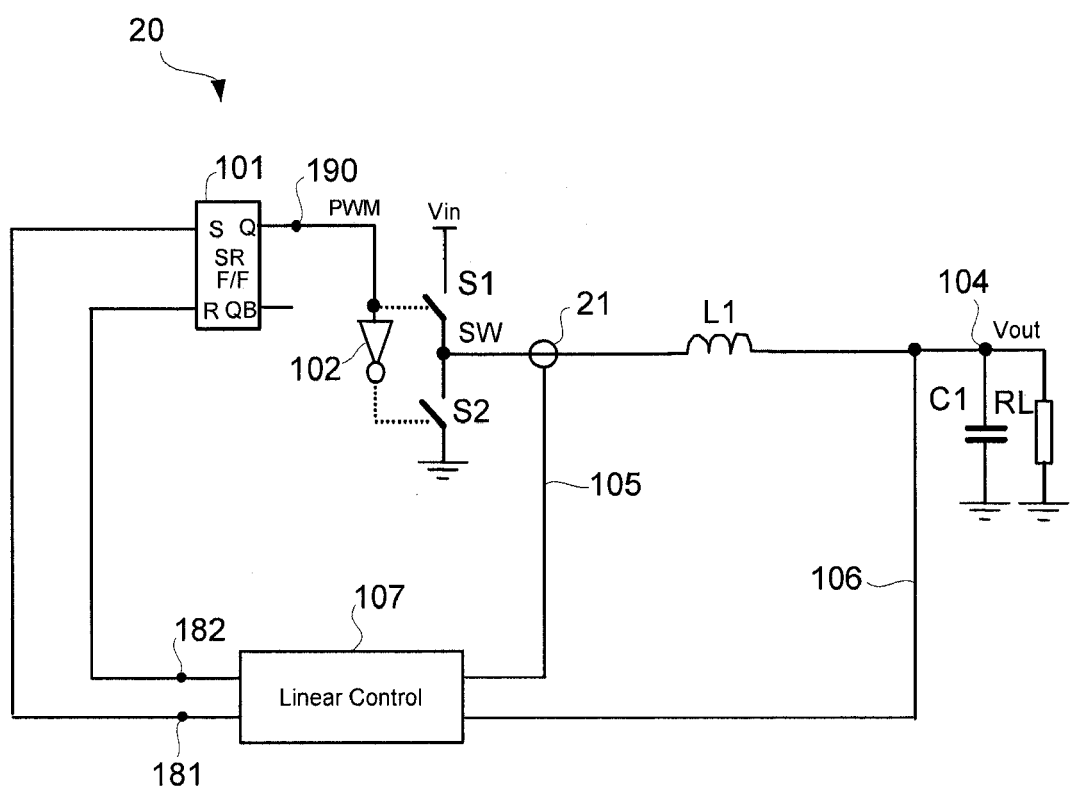
FIG. 1 schematically shows a voltage regulator in accordance with an embodiment of the present invention.

FIG. 1 schematically shows a voltage regulator 20 in accordance with an embodiment of the present invention. In the example of FIG. 1, the regulator 20 is a buck regulator that takes an input voltage VIN to generate an output voltage VOUT. The regulator 20 may have multiple phases, and thus have several phase output blocks, but only one phase is shown in FIG. 1 for clarity of illustration.

In one embodiment, the switches S1 and S2 represent synchronously switched transistors (e.g., MOSFET). The switch S1 is also referred to as the "top transistor" or "top switch," while the switch S2 is also referred to as the "bottom transistor" or "bottom switch." The node between the switches S1 and S2 is also referred to as "the switch node SW." An inverter 102 allows the switch S2 to be OFF (i.e., open) when the switch S1 is turned ON (i.e., closed), and to be ON when the switch S1 is turned OFF. The switch S1 is turned ON to allow the input power supply providing the input voltage VIN to charge an output capacitor C1 and source current to the load RL through an output inductor L1, and thereby increase the voltage across the load RL. The switch S1 is turned OFF to stop charging the output capacitor C1 and sourcing current to the load RL, decreasing the voltage across the capacitor C1 over time. The linear control circuit 107 controls the switching of the switches S1 and S2 by pulse width modulation (PWM) so that the output voltage VOUT across the load RL at the node 104 can be maintained within regulation.

The linear control circuit 107 monitors the inductor current, which is the electrical current flowing through the output inductor L1. The inductor current is indicative of load current. A path 105 may include a lossless current sense circuit 21 or other conventional current sense circuit for allowing the linear control circuit 107 to monitor inductor current. The linear control circuit 107 may employ the inductor current information for current mode control and phase current balancing control.

In one embodiment, the linear control circuit 107 comprises a current-mode control circuit with two feedback loops: an inner current loop that includes the path 105 and an outer voltage loop that includes the path 106. The linear control circuit 107 may monitor the output voltage VOUT on the path 106 to determine the value of the output voltage VOUT relative to a reference voltage. The current through an output inductor L1 is indicative of the load current. The lossless current sense circuit 21 provides sensed inductor current to the linear control circuit 107 by way of the path 105. The linear control circuit 107 may generate a control signal on a node 181 to set the SR flip-flop 101 and thereby turn ON the top switch (i.e., switch S1) to charge the output capacitor C1 and source current to the load RL. The Q output of the SR flip-flop 101 at a node 190 provides a pulse width modulation (PWM) signal. The linear control circuit 107 may generate a reset signal on a node 182 to reset the SR flip-flop 101 to turn OFF the top switch and turn ON the bottom switch (i.e., switch S2). The linear control circuit 107 may use load current information from the current loop on the path 105 and output voltage information from the voltage loop on the path 106 to control the duty cycle of the top switch S1 and thereby maintain the output voltage VOUT within its regulation band.

Figure 2:
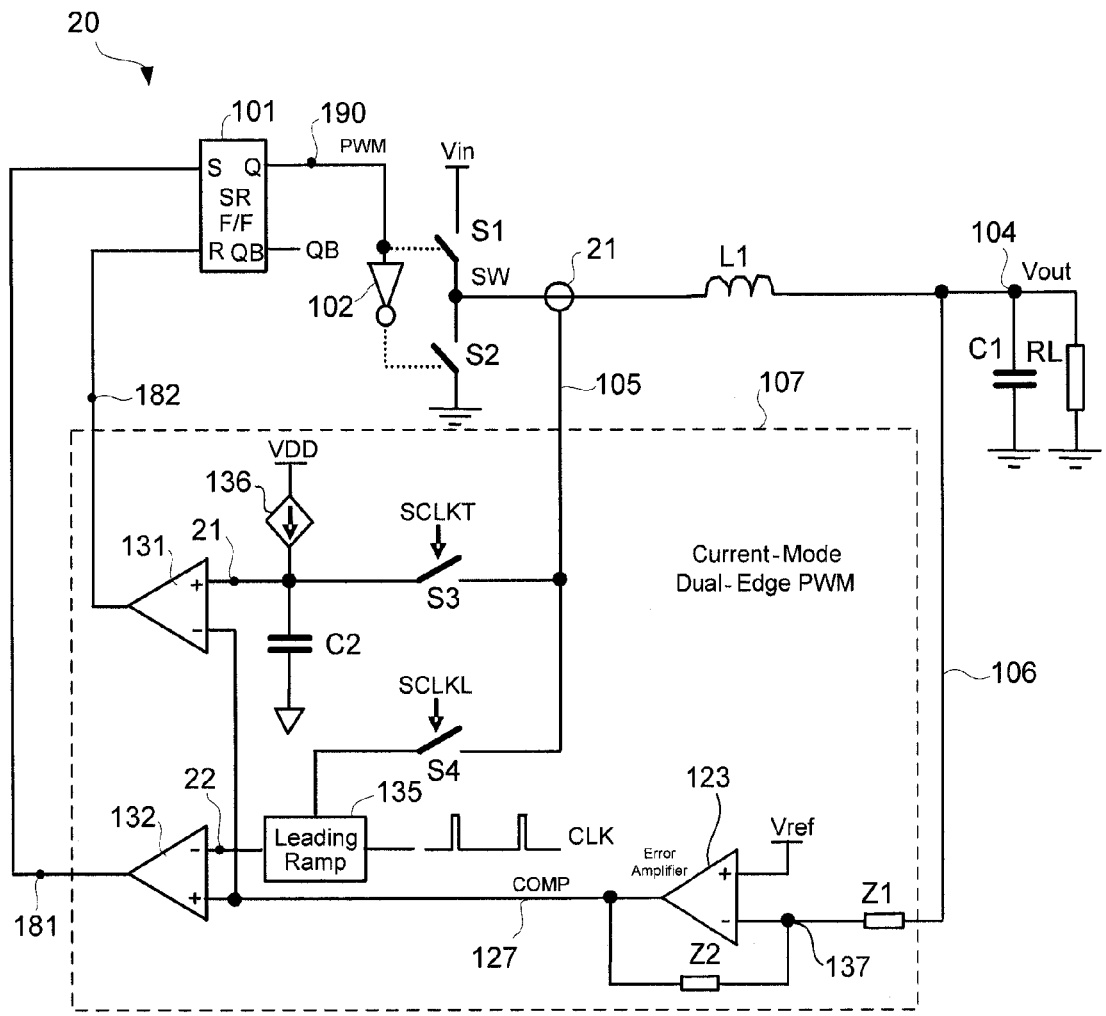
FIG. 2 schematically shows a linear control circuit configured for current-mode control, dual-edge PWM with two sample windows in accordance with an embodiment of the present invention.
Figure 4:
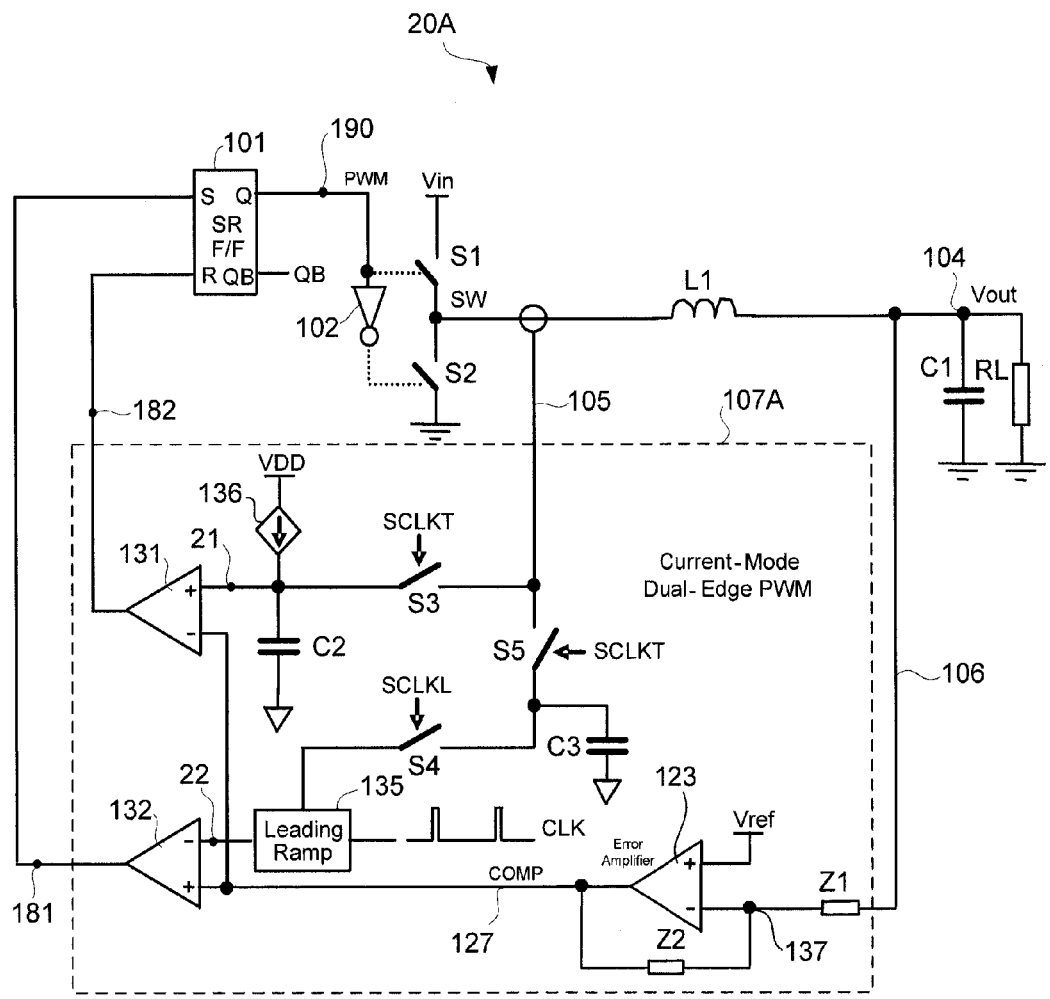
FIG. 4 schematically shows a linear control circuit configured for current-mode control, dual-edge PWM with one sample window in accordance with an embodiment of the present invention.

FIG. 2 schematically shows the voltage regulator 20 with the linear control circuit 107 configured for current-mode control, dual-edge PWM with two sample windows in accordance with an embodiment of the present invention. A linear control circuit 107 configured for current-mode control, dual-edge PWM with one sample window is shown in FIG. 4 and labeled as linear control circuit 107A.

As in FIG. 1, the linear control circuit 107 receives load current information on the path 105 and output voltage information on the path 106. The linear control circuit 107 outputs a control signal on the node 181 and a reset signal on the node 182. The operation of components outside of the linear control circuit 107 has been previously discussed with reference to FIG. 1.

In the example of FIG. 2, a trailing clock signal SCLKT periodically closes the switch S3 to sample the sensed inductor current on the path 105. The sampled sensed inductor current sets the initial voltage of the capacitor C2 and the current source 136 charge the capacitor C2 to generate a trailing ramp signal on the node 21. Similarly, a leading clock signal SCLKL periodically closes the switch S4 to sample the sensed inductor current on the path 105 to define the initial voltage of the leading ramp and trigger the leading ramp generator circuit 135 to generate a leading ramp signal on the node 22. The leading ramp generator circuit 135 synchronizes generation of the leading ramp signal with a clock signal CLK, which defines the switching frequency of the regulator. In one embodiment, the clock signal CLK leads the leading ramp signal, which in turn leads the trailing ramp signal. The leading and trailing ramp signals are out of phase and may be level shifted using the sensed inductor current.

A voltage error amplifier 123 coupled to the voltage loop on the path 106 compares the output voltage VOUT on the node 104 to a reference voltage VREF to regulate the output voltage VOUT within regulation tolerance band. The output of the error amplifier 123 at a node 127 is also referred to as the comparison signal "COMP." As can be appreciated, the comparison signal COMP is indicative of the difference between the output voltage VOUT and the reference voltage VREF. The comparison signal COMP is also indicative of the load current in current mode control. The gain of the error amplifier 123 is governed by the ratio of impedance network Z2 to impedance network Z1. Impedance networks Z1 and Z2 may each represent a combination of resistors and capacitors. As will be more apparent below, the feedback signal FB at the input node 137 of the error amplifier 123 may be compared to the output voltage VOUT on the other side of the input impedance network Z1 to detect load current step changes.

A comparator 131 compares the trailing ramp signal to the comparison signal COMP to control turning OFF of the top switch S1. Generally speaking, the trailing ramp signal provides a reference as to when to turn OFF the top switch S1. In the example of FIG. 2, the comparator 131 sends a reset signal to the SR flip-flop 101 to turn OFF the top switch S1 and turn ON the bottom switch S2 when trailing ramp signal rises above (i.e., becomes greater than) the comparison signal COMP. A comparator 132 compares the leading ramp signal to the comparison signal COMP to control turning ON of the top switch S1. Generally speaking, the leading ramp signal provides a reference as to when to turn ON the top switch S1. In the example of FIG. 2, the comparator 132 sends a control signal to set the SR flip-flop 101 to turn ON the top switch S1 and turn OFF the bottom switch S2 when the leading ramp signal goes below (i.e., becomes less than) the comparison signal COMP.

Figure 3:
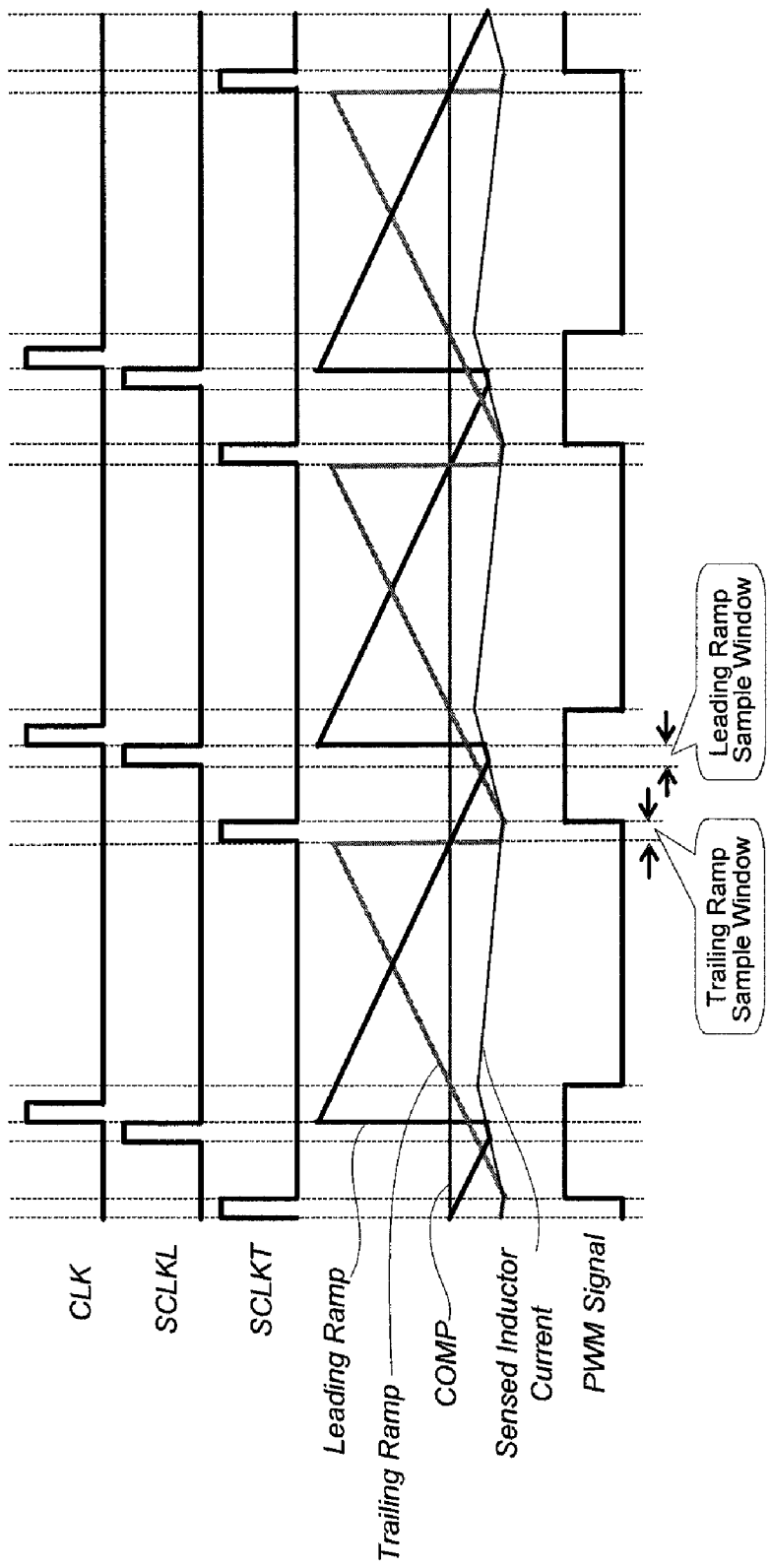
FIG. 3 shows an example timing diagram of signals in the regulator of FIG. 2.

FIG. 3 shows an example timing diagram of signals in the regulator 20 of FIG. 2. In the example of FIG. 3, the leading clock signal SCLKL has a pulse just before the rising edge of the leading ramp clock signal CLK. The pulse width of the leading clock signal SCLKL provides a sampling window for sampling the sensed inductor current to define the leading ramp signal valley (i.e., lowest) voltage for the next clock cycle on the node 22 (see FIG. 2). The leading ramp peak-to-valley (i.e., highest to lowest) voltage is fixed, but the leading ramp valley voltage is determined by the sensed inductor current during the leading ramp sample window defined by the leading clock signal SCLKL. The trailing clock signal SCLKT has a pulse at a predetermined time before the PWM signal goes high or the top switch S1 turns ON. The pulse width of the trailing clock signal SCLKT provides a sampling window for the trailing ramp capacitor C2 to discharge to the sensed inductor current level and to generate the initial voltage of the trailing ramp signal on the node 21 (see FIG. 2). FIG. 3 also shows the PWM signal on the node 190, the sensed inductor current through the output inductor L1, and the comparison signal COMP on the node 127. The clock signals CLK, SCLKT, and SCLKL may be generated by a clock generation circuit (not shown). The PWM signal represents the duty cycle of the top switch S1.

FIG. 4 schematically shows a voltage regulator 20A in accordance with an embodiment with the present invention. The regulator 20A is a particular embodiment of the regulator 20. In the example of FIG. 4, the regulator 20A is the same as the regulator 20 except for the use of a linear control circuit 107A instead of the linear control circuit 107.

The linear control circuit 107A is the same as the linear control circuit 107 of FIG. 2 except for the addition of a switch S5 and a capacitor C3. The linear control circuit 1070A is configured for current-mode control, dual-edge PWM with one sample window. As before, a trailing clock signal SCLKT periodically closes the switch S3 to sample the sensed inductor current on the path 105. The sampled sensed inductor current defines the initial voltage of the capacitor C2 and the current source 136 charge the capacitor C2 to generate a trailing ramp signal on the node 21. In the linear control circuit 107A, the trailing clock signal SCLKT also clocks the switch S5 to charge the capacitor C3. In effect, the switch S5 and the capacitor C3 serve as a sample and hold circuit that samples the inductor current with the trailing clock signal SCLKT. The leading clock signal SCLKL clocks the switch S4 to sample the sampled inductor current held on the capacitor C3 to define the valley voltage of the leading ramp and trigger the leading ramp generator circuit 135 to generate a leading ramp signal on the node 22. The leading ramp generator circuit 135 synchronizes generation of the leading ramp signal with a clock signal CLK that defines the switching frequency of the regulator. The clock signal CLK leads the leading ramp signal, which in turn leads the trailing ramp signal.

Figure 5:
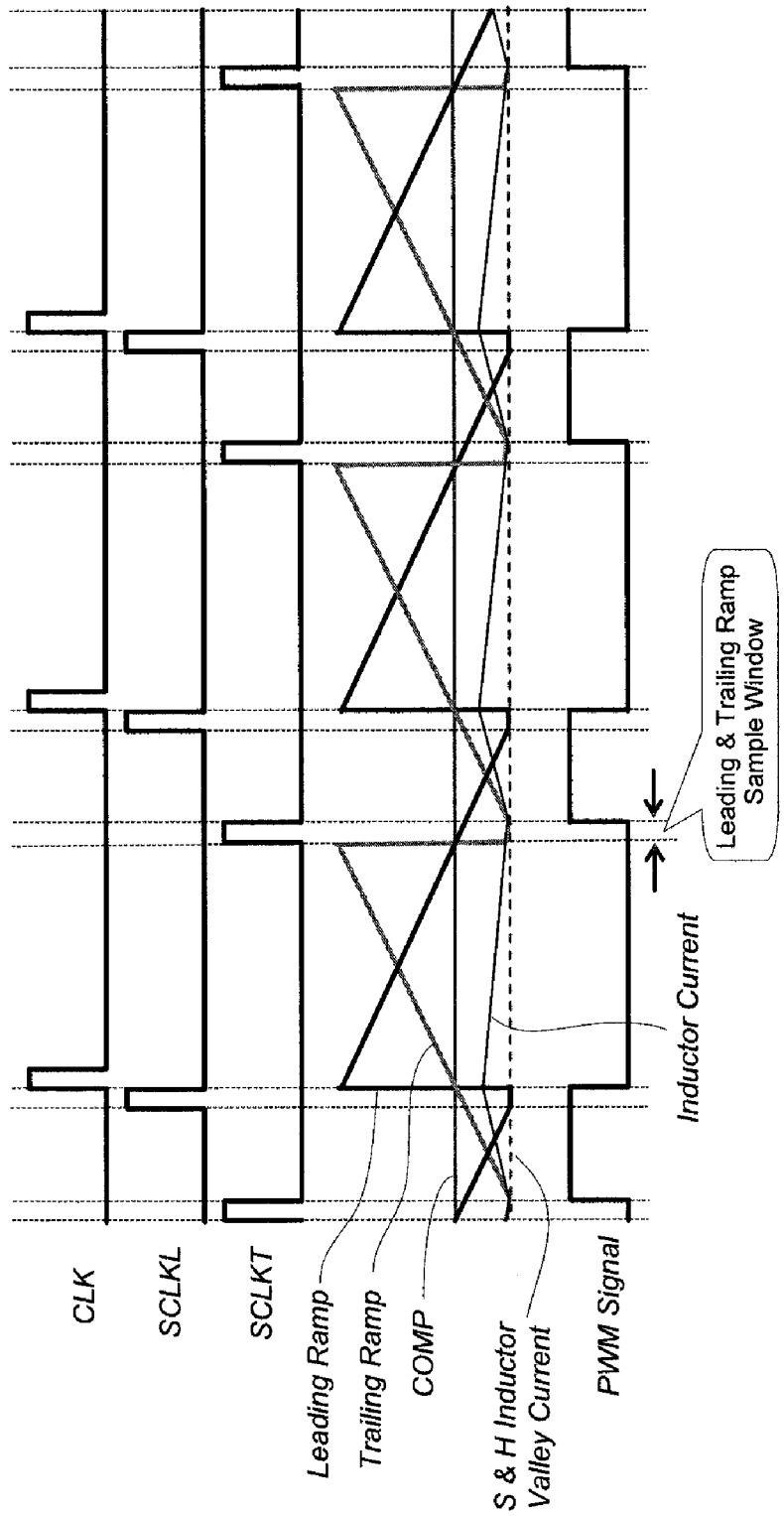
FIG. 5 shows an example timing diagram of signals in the regulator of FIG. 4

FIG. 5 shows an example timing diagram of signals in the regulator 20A of FIG. 4. In the example of FIG. 5, the leading clock signal SCLKL has a pulse just before the rising edge of the clock signal CLK. The trailing clock signal SCLKT has a pulse at a predetermined time before the rising edge of the leading clock signal SCLKL. The pulse width of the trailing clock signal SCLKT provides a sampling window for sampling the sensed inductor current to generate the trailing ramp signal on the node 21 (see FIG. 4) and to charge the capacitor C3. The valley (or lowest point) of the sampled and held inductor current on the capacitor C3 is labeled on FIG. 5 as the "S&H Inductor Valley Current." The pulse width of the leading clock signal SCLKL samples the sampled & hold inductor current on the capacitor C3 to define the valley voltage of the leading ramp signal through the leading ramp signal generator circuit 135 to generate the leading ramp signal on the node 22. FIG. 5 also shows the PWM signal on the node 190, the sensed inductor current through the output inductor L1, and the comparison signal COMP on the node 127. The clock signals CLK, SCLKT, and SCLKL may be generated by a clock generation circuit (not shown).

Load current is the electrical current drawn by the load from the regulator. For purposes of the present disclosure, a load current has a high slew rate when it has a slew rate of around 100 A/μs and above, and has a high repetition rate when its repetition rate is around 100 kHz and above. A load current step change is a rapid change in load current. A step change may be a step-up change where the load current rapidly changes from low current levels to high current levels, or a step-down change where the load current rapidly changes from high current levels to low current levels.

A load current step change may result in fast load current slew rates. When this occurs, the delay between the load current step change and the regulator's switching response to the step change is crucial. In addition, due to the electrical current slew rate limitation of the power inductor to respond to changes in load current, the regulator's output voltage undershoot or overshoot will be very high even when the regulator is capable of instantly turning ON or OFF the associated switch. These are major limitations of voltage regulators that employ linear controllers. The following embodiments address these issues by providing a non-linear control scheme that rapidly responds to a fast load current step changes.

Figure 6:
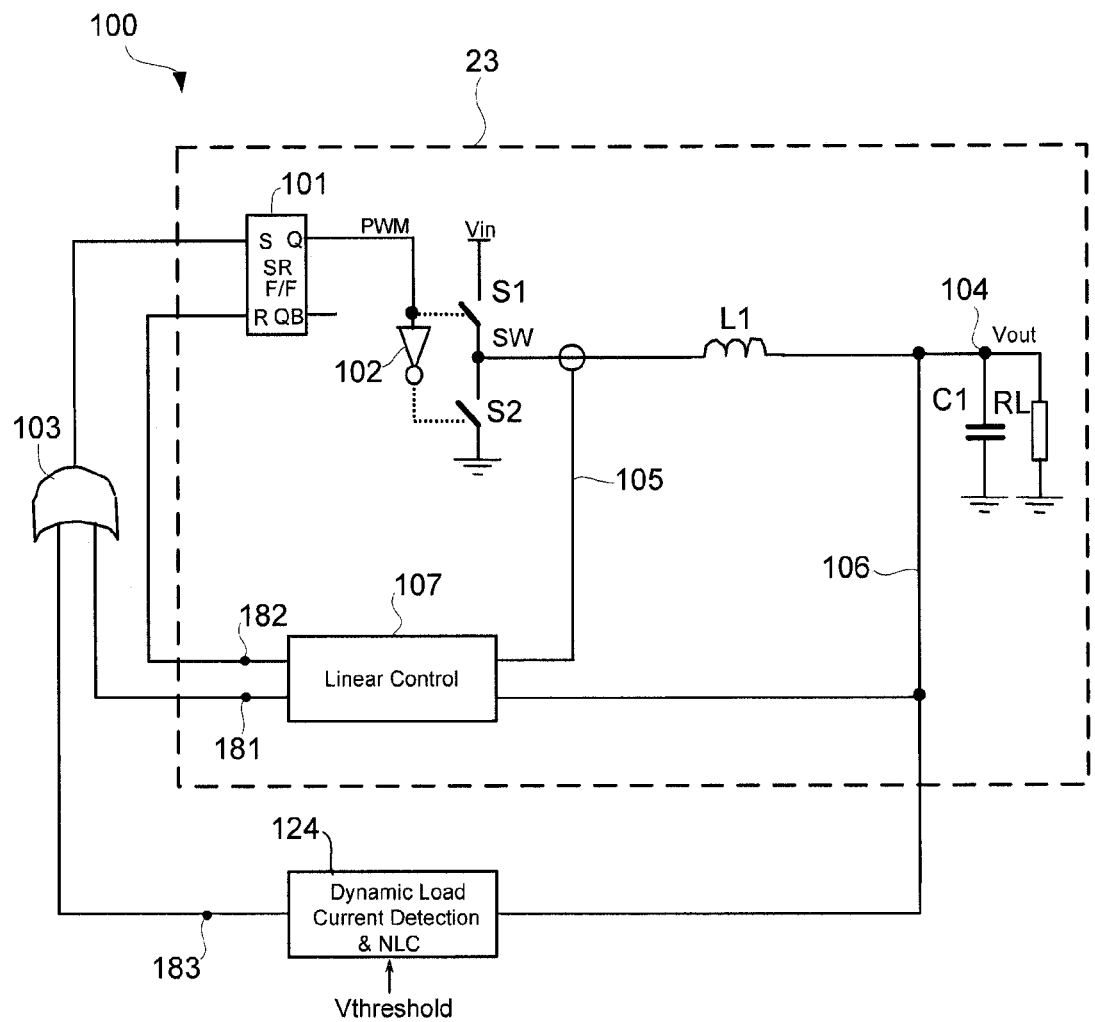
FIG. 6 schematically shows a current-mode control, dual-edge PWM voltage regulator with non-linear control in accordance with an embodiment of the present invention.
Figure 12:
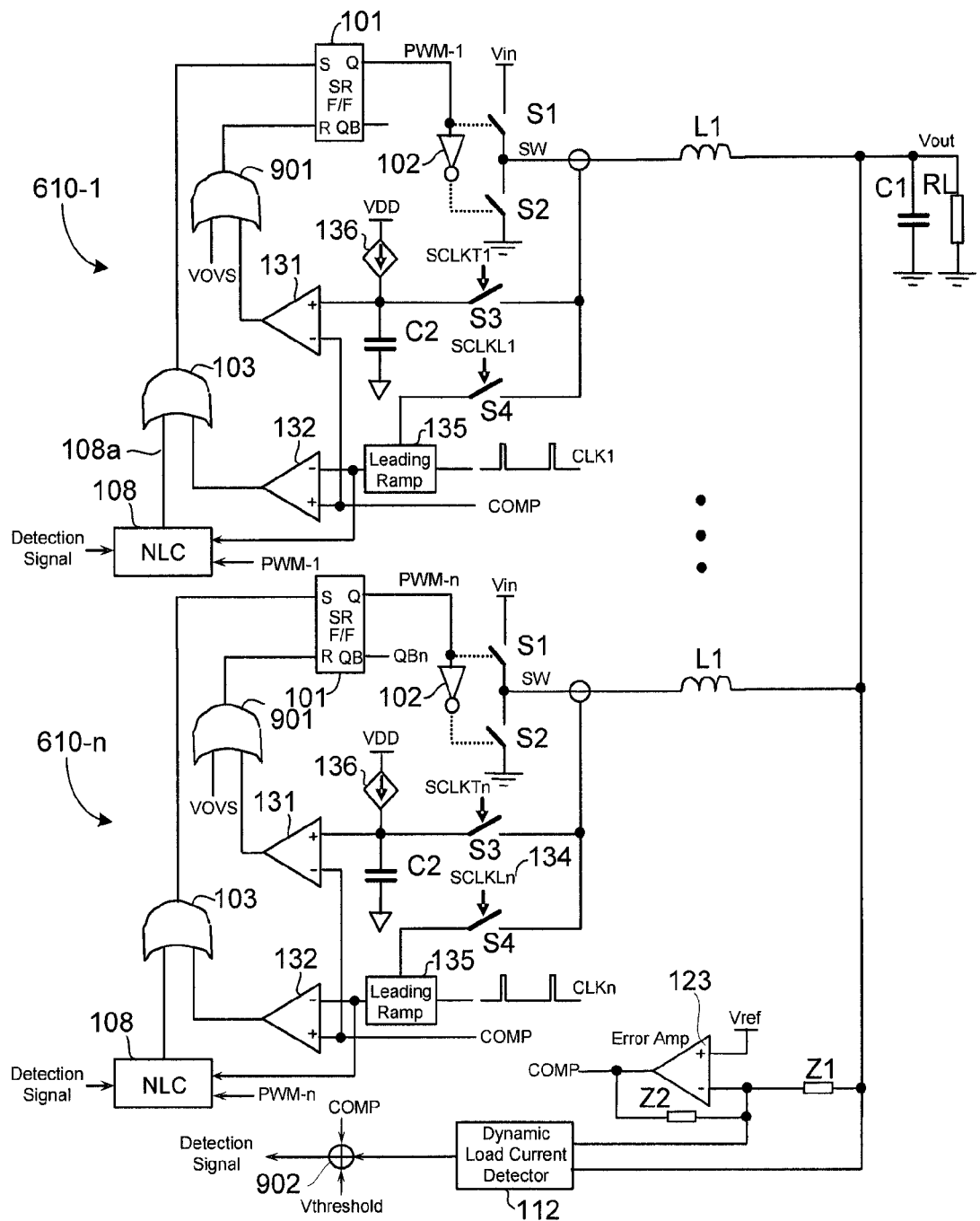
FIG. 12 shows the difference phases of a voltage regulator in accordance with an embodiment of the present invention.

Referring now to FIG. 6, there is schematically shown a current-mode control, dual-edge PWM voltage regulator 100 with non-linear control in accordance with an embodiment of the present invention. In the example of FIG. 6, the regulator 100 is shown with a single phase for clarity of illustration. As can be appreciated, the regulator 100 may have one or more phases depending on the application. A multi-phase regulator 100 is shown in FIG. 12.

In the example of FIG. 6, the operation of the components within the dashed line 23 has been discussed with reference to FIGS. 1 and 2. That is, the components within the dashed line 23 represent the previously discussed voltage regulator 20. In the regulator 100, an OR gate 103 allows either the linear control signal on the node 181 or a non-linear control clock on the node 183 to set the SR flip-flop 101, and thereby turn ON the top switch S1 to charge the capacitor C1 and source current to the load RL. The non-linear control clock on the node 183 may be generated by a dynamic load current detection and non-linear control block 124. During normal operation, in the absence of rapid load current step change, the linear control circuit 107 controls the turning ON of the top switch S1 as previously explained. When the load current varies at high slew rates or high repetition rates, the large load current step change triggers the block 124 to generate non-linear control clock pulses on the node 183 to charge the output capacitor C1 and source current to the load RL. The non-linear control clock pulses are generated in between linear control signal pulses on the node 181. In effect, the block 124 turns ON the top switch S1 in load current conditions where the linear control signal 107 cannot turn ON the top switch S1 in time to prevent the output voltage VOUT on the node 104 from dropping out of regulation. In the example of FIG. 6, the block 124 accepts a threshold voltage input Vthreshold for non-linear control optimization.

Figure 7:
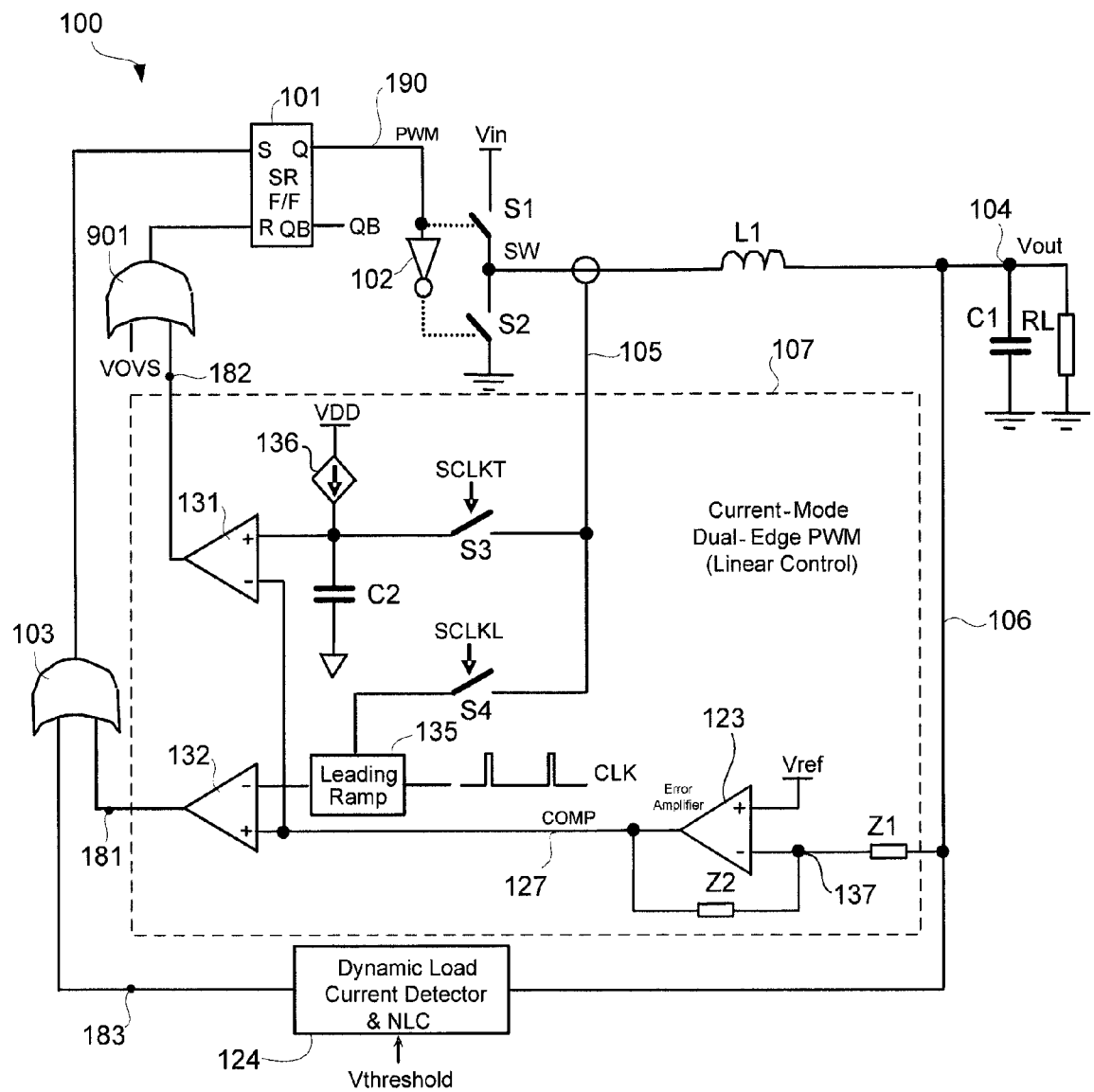
FIG. 7 shows additional details of the regulator of FIG. 6 with output voltage overshoot control in accordance with an embodiment of the present invention.

FIG. 7 shows additional details of the regulator 100 with output voltage overshoot control in accordance with an embodiment of the present invention. The operation of the components of the linear control circuit 107 in conjunction with the SR flip-flop 101, the inverter 102, the switches S1 and S2, the output inductor L1, the output capacitor C1, and the load RL has been previously described with reference to FIG. 2.

In the example of FIG. 7, an OR gate 901 allows either the reset signal from the comparator 131 or an overshoot control voltage VOVS to reset the SR flip-flop 101, and thereby turn OFF the top switch S1. The overshoot control voltage VOVS may be generated by the block 124 upon detection of a load current step-down change sufficient to cause the output voltage VOUT to overshoot. The block 124 otherwise operates with the linear control circuit 107 as previously described with reference to FIG. 6.

Figure 8:
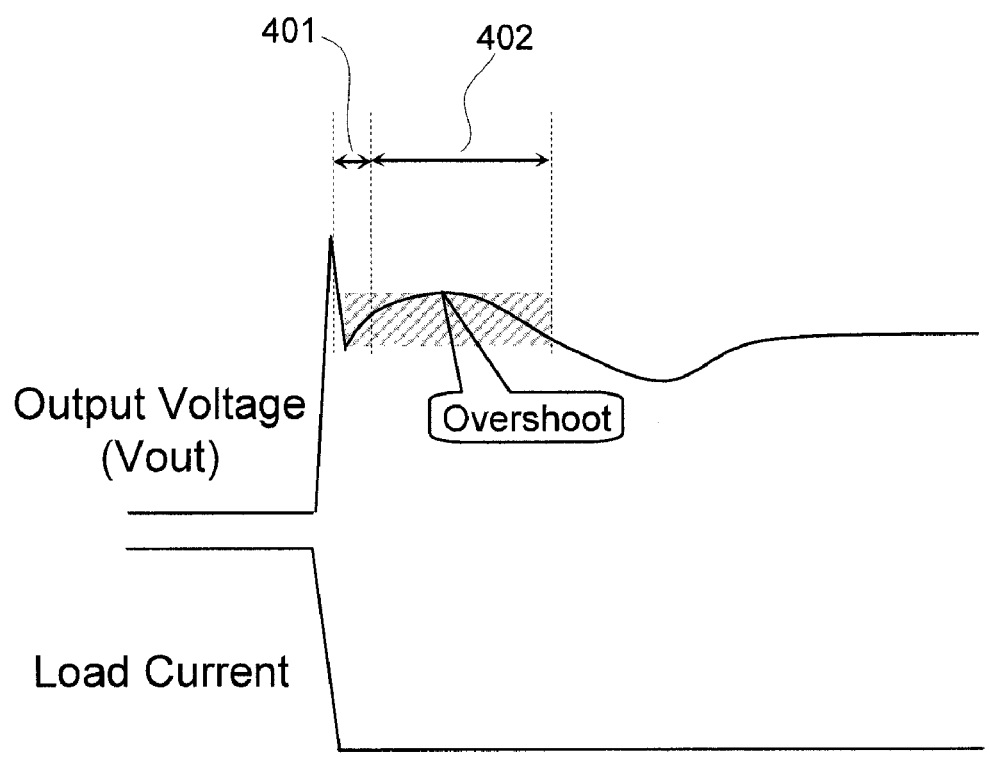
FIG. 8 schematically illustrates output voltage overshoot.

The output voltage VOUT may overshoot upon a load current step-down change, especially at high load current slew rates. This is schematically illustrated in FIG. 8 where the load current step-down change results in the output voltage VOUT spiking well above the regulated voltage, goes down, then overshoots the regulated voltage on the way back up. Although the output voltage VOUT eventually settles at steady state, the overshoot may violate the upper regulation tolerance band of the regulator. Conventional approaches to controlling overshoot typically involve detecting zero-crossing of the inductor current, which may be too late in some applications. That is, conventional overshoot control attempts to detect and address the portion of the overshoot labeled in FIG. 8 as 402, which happens after the overshoot has already partially occurred. In contrast, the block 124 may be configured to detect the portion of the overshoot labeled in FIG. 8 as 401. This advantageously allows for detection and control of the overshoot before the zero-crossing of the inductor current and before the output voltage fully builds up to overshoot. In one embodiment, the block 124 dynamically detects the load current step-down change and, in response, generates the overshoot control voltage VOVS to turn OFF the top switch S1 (i.e., the transistor coupling the input voltage VIN to the load through the inductor L1) before the inductor current becomes zero.

Figure 9:
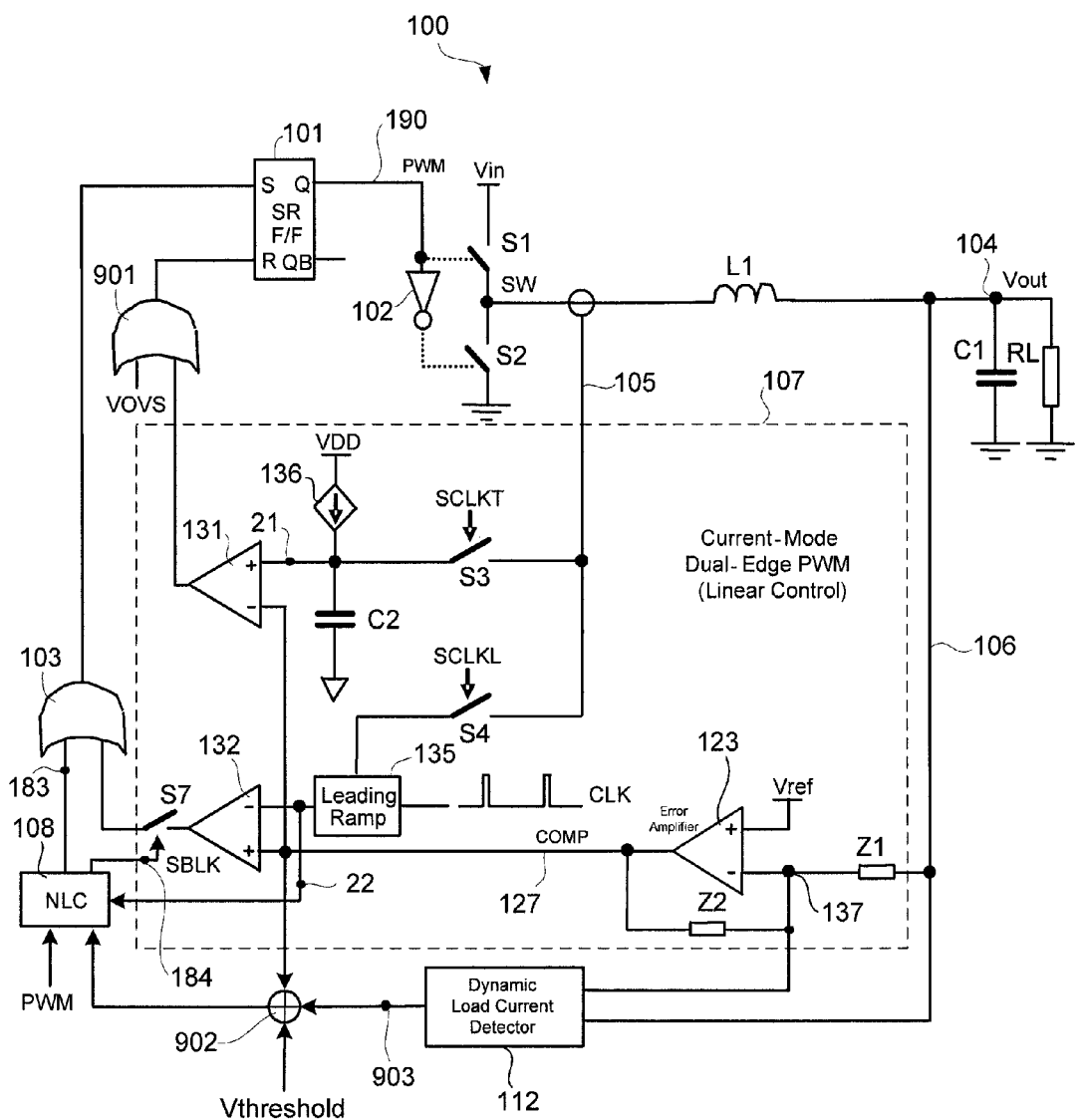
FIG. 9 schematically shows further details of the voltage regulator of FIG. 7 in accordance with an embodiment of the present invention.

FIG. 9 schematically shows further details of the voltage regulator 100 in accordance with an embodiment of the present invention. In the example of FIG. 9, the block 124 of FIG. 7 is shown as comprising a dynamic load current detection circuit 112, a non-linear control circuit 108, and a summation block 902. The components shown in FIG. 9 otherwise operate in the same manner as those shown in FIG. 7.

A dynamic load current detector 112 may comprise an electrical circuit that detects load current step changes at high slew rate and/or high repetition rates. The dynamic load current detector 112 may be configured to generate a load current detection signal on the node 903 to inform a non-linear control circuit 108 of a load current step change.

The summation block 902 may be configured to receive the comparison signal COMP on the node 127, the load current detection signal on the node 903, and the threshold voltage input Vthreshold. The summation block 902 allows the load current detection signal and the comparison signal COMP to be level shifted by the threshold voltage input Vthreshold for comparsion by the non-linear control circuit 108.

The non-linear control circuit 108 may be configured to receive the PWM signal from the node 190 (i.e., Q output of the SR flip-flop 101), the leading ramp signal from node 22, and the adjusted load current detection signal from the summation block 902 to determine if the load current is stepping-up at high slew rate or repetition rate such that the linear control circuit 107 will not be able to maintain the output voltage VOUT within regulation. If so, the non-linear control circuit 108 may generate non-linear control clock pulses on the node 183 to turn ON the top switch S1.

The non-linear control circuit 108 may also be configured to determine if the load current sufficiently steps-down to cause the output voltage VOUT to overshoot. If so, the non-linear control circuit 108 may be configured to generate the overshoot control voltage VOVS on the input of the OR gate 901 to reset the SR flip-flop 101 and thereby turn OFF the top switch S1.

In the example of FIG. 9, the non-linear control circuit 108 controls a switch S7 with a blanking signal SBLK for non-linear control blanking, which is further described with reference to FIG. 10. The switch S7 is open when the non-linear control circuit 108 issues the blanking signal SBLK on the node 184 to prevent the top switch S1 from being turned ON by the comparator 132 right after a non-linear control event. The ON period of the switch S7 may be defined by a predetermined non-linear control blanking time.

Figure 10:
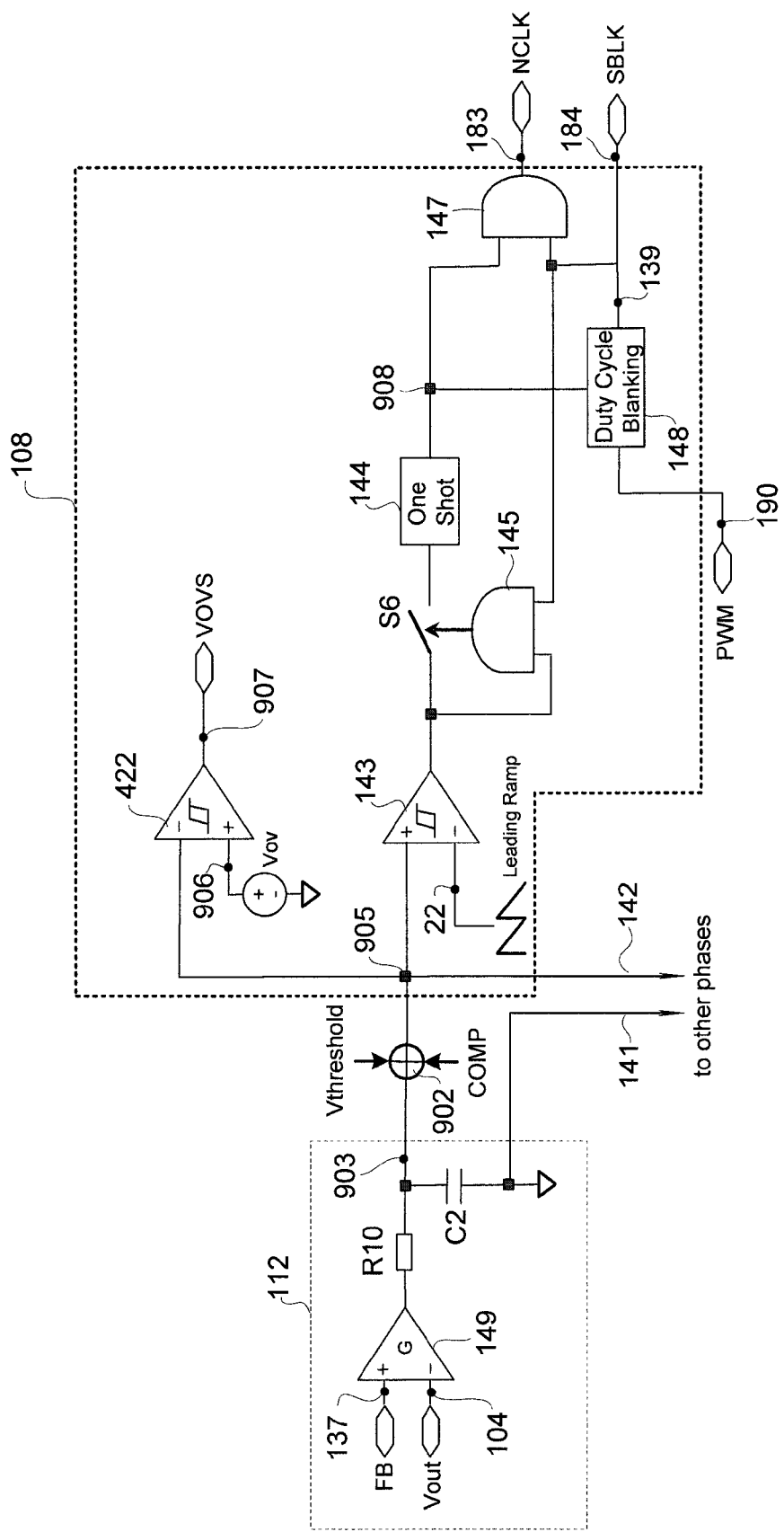
FIG. 10 schematically shows details of a dynamic load current detector and a non-linear control circuit in accordance with an embodiment of the present invention.

FIG. 10 schematically shows details of the dynamic load current detector 112 and non-linear control circuit 108 in accordance with an embodiment of the present invention. A single dynamic load current detector 112 may be shared by several phase output blocks of the voltage regulator. This is illustrated in FIG. 10, where the output of the dynamic load current detector 112 may be coupled to other non-linear control circuits 108 of other phase output blocks by way of lines 141 and 142 (see also FIG. 12).

In the example of FIG. 10, the dynamic load current detector 112 includes a differential amplifier 149 that takes a feedback signal FB at the node 137 (see also FIG. 9, input to error amplifier 123) and the output voltage VOUT at the node 104 as inputs. Because of the high gain of the error amplifier 123, the feedback signal FB is relatively constant and is essentially the same as the reference signal VREF. In contrast, the output voltage VOUT changes with the load current. Therefore, the difference between the feedback signal FB and the output voltage VOUT is indicative of change in load current. The larger the change in load current, the larger the difference.

Still referring to FIG. 10, the load current change information is output by the amplifier 149 and filtered by a noise filter formed by a resistor R10 and a capacitor C2. The filtered load current change information on a node 903 is provided to an input of the summation block 902, which level shifts the filtered output of the amplifier 149 by the comparison signal COMP and threshold input voltage Vthreshold to allow the comparator 143 and the comparator 422 to make a calibrated comparison. The threshold input voltage Vthreshold may be used for the level shifting and optimize the load current step change detection.

The comparator 143 compares the adjusted load current change information on the node 905 with the leading ramp signal on the node 22 (see also FIG. 9) to determine if the load current has stepped-up large enough to trigger the non-linear control circuit 108 to turn ON the top switch S1. The non-linear control circuit 108 advantageously uses the same leading ramp signal that is used for current mode dual-edge pulse width modulation for non-linear control.

When the load current steps-up at high slew rates, the adjusted load current change information on the node 905 will be higher than the leading ramp signal on the node 22. This results in the comparator 143 triggering a one-shot circuit 144 to output a pulse of the non-linear control clock NCLK through the AND gate 147. The pulse of the non-linear control clock NCLK on the node 183 propagates through the OR gate 103 (see FIG. 9) to set the SR flip-flop 101 to turn ON the top switch S1, thereby allowing the power supply providing the input voltage VIN to be coupled and source current to the load through the inductor L1 in response to the rapidly increasing load current.

A duty cycle blanking circuit 148 is configured to remove non-linear control clock NCLK pulses that are too close to one another, which may be due to noise or linear or non-linear operation. This advantageously prevents the top switch from being turned ON too frequently, possibly introducing stability and reliability issues. In the example of FIG. 10, the duty cycle blanking circuit 148 receives a PWM signal at the node 190, which is the output of the SR flip-flop 101 (see FIG. 9). The duty cycle blanking circuit 148 generates a blanking signal SBLK at a node 139 (which is common to the node 184) right after the top switch S1 is turned OFF when the one-shot circuit 144 is fired, as detected on a node 908. The blanking signal SBLK disables for a predetermined blanking time (a) the switch S6 to prevent the comparator 143 from triggering the one-shot circuit 144 and (b) the AND gate 147 and switch S7 to prevent the clock signal CLK and the non-linear clock signal at node 908 from propagating to the SR flip-flop 101. This prevents the top switch S1 from being turned ON for the duration of the blanking time. Note that for clarity of illustration, the switch S7 is only shown in FIG. 9.

A comparator 422 compares the adjusted load current change information on the node 905 with a reference voltage VOV on the node 906 to determine if the load current has sufficiently stepped-down to cause an output voltage overshoot. If the load current step-down is large enough to cause an output voltage overshoot, the comparator 422 outputs a pulse of the overshoot control voltage VOVS on the node 907 to switch OFF the top switch S1. As shown in FIG. 9, the overshoot control voltage VOVS is coupled to the input of the OR gate 901, which drives the reset input of the SR flip-flop 101.

Figure 11:
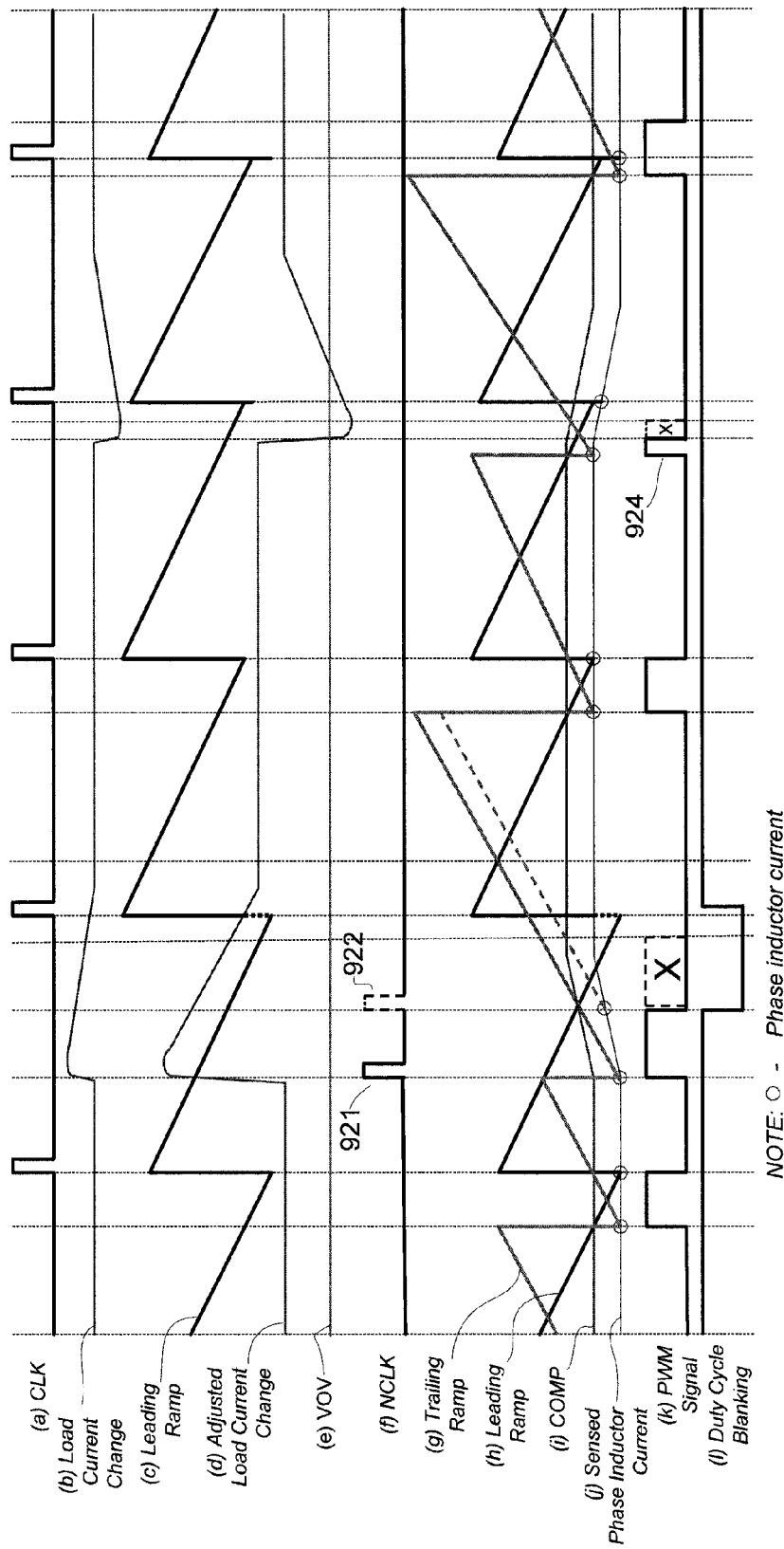
FIG. 11 shows example waveforms of the regulator of FIG. 9 in accordance with an embodiment of the present invention.

FIG. 11 shows example waveforms of the regulator 100 of FIG. 9 in accordance with an embodiment of the present invention. The waveforms of FIG. 11 are not to scale. FIG. 11 includes the following waveforms shown from top to bottom:

(a) Linear control clock signal CLK (input to the leading ramp generator 135 of FIG. 9)

(b) Load current change (difference between the feedback signal at the node 137 minus the output voltage VOUT at the node 104 of FIG. 9)

(c) Leading ramp signal (on node 22 of FIG. 9)

(d) Adjusted load current change (output of summation block 902 on node 905 of FIG. 10)

(e) Reference voltage VOV (on node 906 on FIG. 10)

(f) Non-linear clock signal NCLK (node 183 on FIG. 9, also on FIG. 10)

(g) Trailing ramp signal (on node 21 of FIG. 9)

(h) Leading ramp signal (same as in (c))

(i) Comparison signal COMP (on node 127 of FIG. 9; output of the error amplifier 123)

(j) Sensed phase inductor current (current through output inductor L1 of the particular phase)

(k) PWM signal (on node 190 of FIG. 9; also represents duty cycle of the top switch S1)

(l) Duty cycle blanking (on node 139 of FIG. 10)

Referring to FIG. 11, the load current change information is amplified (e.g., by the differential amplifier 149 of FIG. 10) and level shifted (e.g., by the summation block 902 of FIG. 10) to result in an adjusted load current change information that can be compared directly with the leading ramp signal. When the adjusted load current change exceeds the leading ramp signal, indicating a load current step-up change at high slew rate or repetition rate, the non-linear control circuit 108 generates pulses of the non-linear control clock NCLK (see 921 and 922) to turn on the top switch S1. The duty cycle blanking circuit 148 prevents repeated ON time of the top switch S1, and disables the second pulse of the non-linear control clock NCLK (see "X" on PWM signal pulse).

When the adjusted load current change goes below the reference voltage VOV, indicating a load current step-down change that may lead to output voltage overshoot, the non-linear control circuit 108 generates the overshoot control voltage VOVS to turn OFF the top switch S1. In FIG. 11, this is illustrated by the narrowing of the PWM signal pulse at that time (see 924). The sensed inductor current sample windows are not shown in FIG. 11 for clarity of illustration. Instead, in FIG. 11, the sample windows are indicated by small circles on the sensed phase inductor current waveform.

FIG. 12 shows the different phases of a multi-phase voltage regulator 100 in accordance with an embodiment of the present invention. In the example of FIG. 12, the regulator 100 includes a plurality of phase output blocks 610 (i.e., 610-1, . . . , 610-n), one for each phase. Each phase output block 610 operates essentially the same as the previously explained embodiments of the regulator 100 except that there are several clock signals CLK (i.e., CLK1, . . . CLKn), SCLKL (i.e., SCLKL1, . . . , SCLKLn), and SCLKT (i.e., SCLKT1, . . . , SCLKTn) that are phased for multi-phase operation. The non-linear control circuit 108 for each phase receives a corresponding PWM (PWM-1, . . . , PWM-n) signal from the same phase.

In the example of FIG. 12, the phase output blocks 610 share the same error amplifier 123 and dynamic load current detector 112. As previously explained, the load current detector 112 outputs the detection signal to the non-linear control circuits 108 to allow for fast response to load current step-up change or to prevent output voltage overshoot resulting from load current step-down change.

Figure 13:
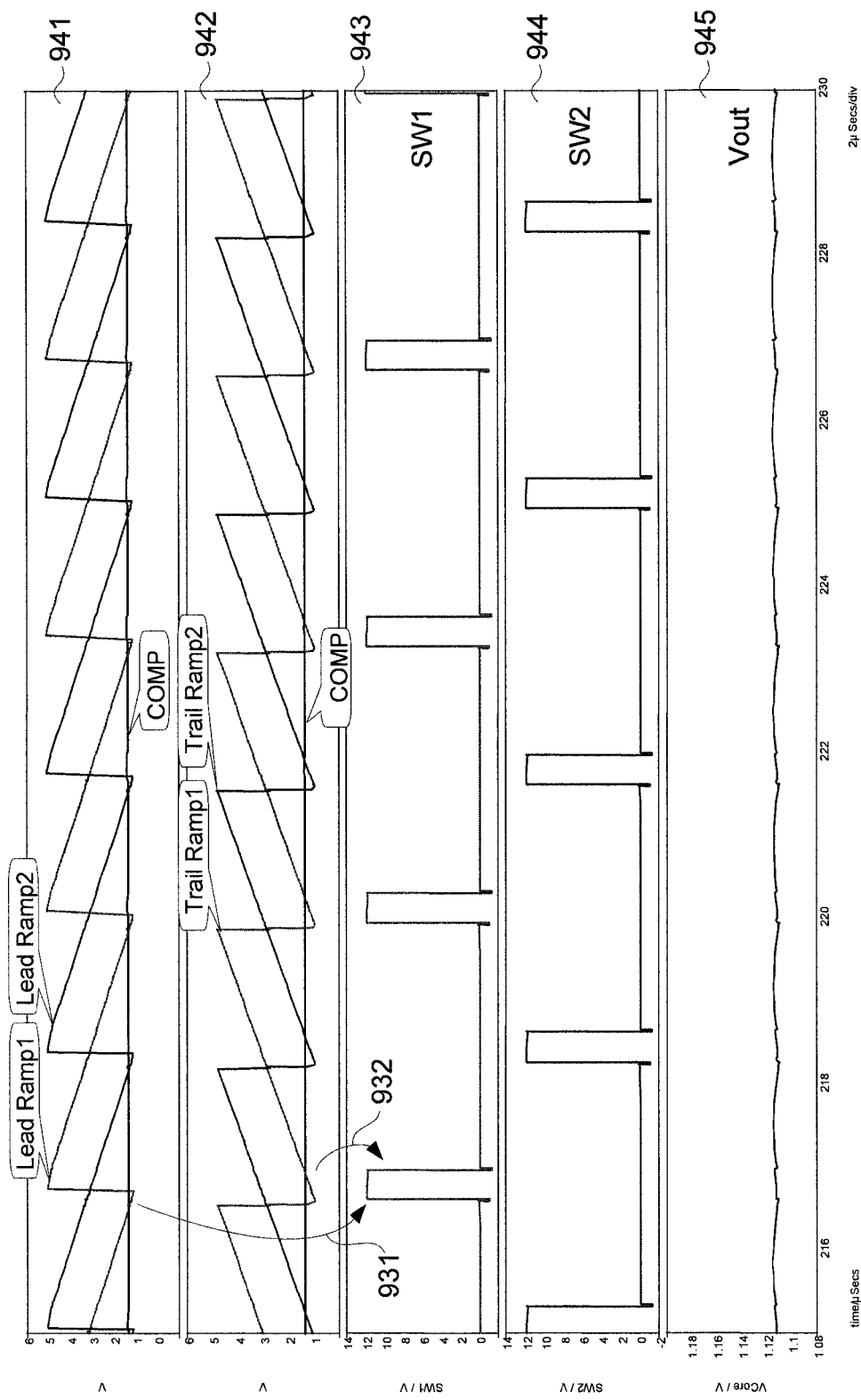
FIGS. 13 and 14 show example simulation waveforms of a two-phase voltage regulator in accordance with an embodiment of the present invention.
Figure 14:
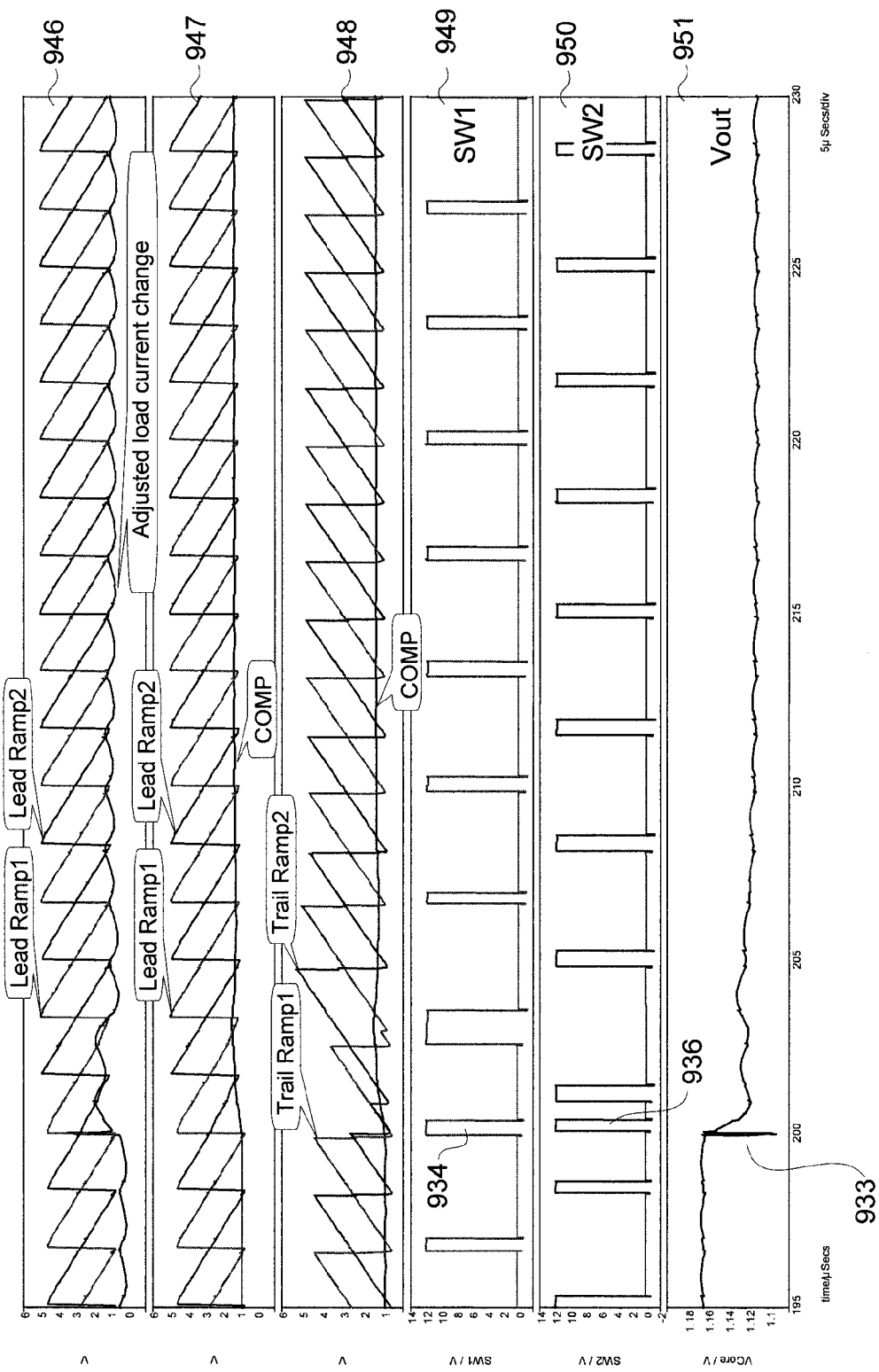

FIGS. 13 and 14 show example simulation waveforms of a two-phase voltage regulator 100 in accordance with an embodiment of the present invention. In FIGS. 13 and 14, the vertical axis represents voltage in volts while the horizontal axis represents time in microseconds. In FIGS. 13 and 14, the "1" or "2" after the signal name indicates the phase the signal came from. For example, "Lead Ramp 1" is the leading ramp signal of a first phase output block 610, "Lead Ramp 2" is the leading ramp signal of a second phase output block 610, and so on. Similarly, "Trail Ramp 1" is the trailing ramp signal of the first phase output block 610" and Trail Ramp 2" is the trailing ramp signal of the second phase output block 610. Also, "SW1" is the signal on the switch node SW of the first phase output block 610 and "SW2" is the signal on the switch node SW of the second phase output block 610. As can be appreciated, a voltage regulator 100 may have one, two, or more phases depending on the application.

FIG. 13 illustrates the current-mode, dual-edge PWM feature of the voltage regulator 100. FIG. 13 simulates steady state operation at 65 amps, and accordingly does not illustrate the effect of non-linear control. The voltage regulator 100 is dual-edge in that the duty cycle of the top switch S1, represented by the signal on the switch node SW, is controlled by two ramp signals namely, the leading ramp signal and the trailing ramp signal. Waveforms 941 show the leading ramp signals, while waveforms 942 show the trailing ramp signals. The leading and trailing ramp signals are compared to the comparison signal COMP to determine whether or not to initiate or terminate the pulse on the switch node SW. In one embodiment, the rising edge of the pulse on the switch node SW turning ON the top switch S1 is triggered when the leading ramp signal goes below the comparison signal COMP. This is illustrated in the waveform 943, where the decreasing leading ramp signal of the first phase output block results in initiation of the pulse on the switch node SW1 (see arrow 931) to turn ON the corresponding top switch S1. In that embodiment, the falling edge of the pulse on the switch node SW turning OFF the corresponding top switch S1 is triggered when the trailing ramp signal rises above the comparison signal COMP. This is illustrated in the waveform 943, where the rising of the trailing ramp signal of the first phase output block results in termination of the pulse on the switch node SW1 (see arrow 932), turning OFF the top switch S1. The waveform 944 shows the signal on the switch node SW2 of the second phase output block. The waveform 945 shows the output voltage VOUT.

FIG. 14 simulates a load current step-up change from 15 amps to 65 amps at 50 ns in a two phase voltage regulator. In FIG. 14, the waveforms 946 show the leading ramp signals and the adjusted load current change (e.g., signal node 905 of FIG. 10), waveforms 947 show the leading ramp signals and the comparison signal COMP, waveforms 948 show the trailing ramp signals and the comparison signal COMP, waveform 949 shows the signal on the switch node SW1 of the first phase output block, waveform 950 shows the signal on the switch node SW2 of the second phase output block, and waveform 951 shows the output voltage VOUT. The load current step-up triggered the non-linear control circuit 108 and resulted in turning ON the top switch S1 of both phases (see pulses 934 for the first phase, and pulse 936 for the second phase). The pulse 936 is an extra pulse on the switch node SW2. The narrow dip on output voltage VOUT (see 933) is due to the high slew rate of the load current step-up change, and it's not controllable by either linear or non-linear control. Since the narrow dip is typically very narrow, it is not a concern to the load in general. The output voltage VOUT is otherwise relatively stable. Note that the action of the non-linear control circuit to respond to the load current step-up change does not appreciably affect the comparison signal COMP, which has relatively small ripple.

Improved voltage regulators have been disclosed. While specific embodiments of the present invention have been provided, it is to be understood that these embodiments are for illustration purposes and not limiting. Many additional embodiments will be apparent to persons of ordinary skill in the art reading this disclosure.

What is claimed is:

1. A method of controlling a voltage regulator, the method comprising:
using a first ramp signal to control turning ON of a top switch of a voltage regulator, the top switch of the voltage regulator being configured to couple a power supply supplying an input voltage to a load of the voltage regulator;
using a second ramp signal to control turning OFF of the top switch of the voltage regulator, the second ramp signal being out of phase with the first ramp signal;
detecting a step change of a load current drawn by the load from the voltage regulator; and
responding to the step change of the load current by using a non-linear control circuit to control the top switch of the voltage regulator.

2. The method of claim 1 wherein the step change is a step-down change and wherein responding to the step change comprises:
turning OFF the top switch independent of the second ramp signal.

3. The method of claim 2 wherein the top switch is turned OFF before inductor current flowing through an output inductor of the regulator reduces to zero to prevent the output voltage from overshooting.

4. The method of claim 1 wherein the step change is a step-up change and wherein responding to the step change comprises:
turning ON the top switch.

5. The method of claim 1 wherein detecting the step change of the load current comprises:
comparing an output voltage of the regulator with a feedback voltage at an input of a voltage error amplifier of a linear control circuit to generate a detection signal, the error amplifier generating a comparison signal based on a difference between the output voltage and a reference voltage.

6. The method of claim 5 wherein the detection signal is amplified and level shifted with the comparison signal to generate an adjusted detection signal.

7. The method of claim 6 wherein the adjusted detection signal is compared to the first ramp signal to detect the step change of the load current.

8. The method of claim 1 wherein the step change is a step-up change and wherein the nonlinear control circuit uses the first ramp signal to detect a step-up change.

9. The method of claim 1 wherein detecting the step change of the load current comprises:
detecting a difference between an output voltage of the regulator and a feedback voltage at an input of a voltage error amplifier to generate a detection signal; and
comparing the detection signal to the first ramp signal.

10. The method of claim 9 wherein the detection signal is level shifted prior to being compared to the first ramp signal.

11. The method of claim 1 wherein using the first ramp signal to control turning ON of the top switch of the voltage regulator comprises:
comparing the first ramp signal to a comparison signal generated by a voltage error amplifier, the error amplifier being configured to compare the output voltage to a reference voltage.

12. The method of claim 1 wherein using the second ramp signal to control turning OFF of the top switch of the voltage regulator comprises:
comparing the second ramp signal to a comparison signal generated by a voltage error amplifier, the voltage error amplifier being configured to compare the output voltage to a reference voltage.

13. A voltage regulator comprising:
a first switch and a second switch;
a linear control circuit configured to control the first and second switches, the linear control circuit being configured to use a first ramp signal to control turning ON of the first switch and to use a second ramp signal to control turning OFF of the first switch, the first and second ramp signals being out of phase, the first and second switches being synchronously switched; and
a non-linear control circuit configured to source current to a load upon occurrence of a step change of a load current drawn by the load.

14. The regulator of claim 13 further comprising:
a load current detector configured to compare an output voltage of the regulator with a feedback input of a voltage error amplifier of the linear control circuit to sense the step change of the load current.

15. The regulator of claim 13 wherein the non-linear control circuit is configured to turn OFF the top first switch independent of the second ramp signal when the step change comprises a step-down change sufficient to cause an output voltage of the regulator to overshoot.

16. The regulator of claim 13 further comprising:
a duty cycle blanking circuit configured to prevent the first switch from being turned ON during a predetermined blanking time.

17. A method of controlling a voltage regulator, the method comprising:
controlling switching of a pair of synchronously switched transistors using a first signal and a second signal of a linear control circuit, the first and second signals being out of phase;
detecting a step change of a load current drawn by a load from the regulator; and
responding to the step change of the load current by controlling switching of the pair of synchronously switched transistors using a non-linear control circuit.

18. The method of claim 17 wherein the first signal is a first ramp signal and the second signal is a second ramp signal.

19. The method of claim 18 wherein the nonlinear control circuit uses the first ramp signal to detect a step-up change of the load current.

20. The method of claim 17 wherein the first signal is used to control turning ON of a switch in the pair of synchronously switched transistors and the second signal is used to control turning OFF of the switch, the switch being configured to couple an input voltage power supply to the load.

* * * * *

UNITED STATES PATENT AND TRADEMARK OFFICE
CERTIFICATE OF CORRECTION

| | | |
|---|---|---|
| PATENT NO. | : 7,764,054 B1 | Page 1 of 1 |
| APPLICATION NO. | : 12/124953 | |
| DATED | : July 27, 2010 | |
| INVENTOR(S) | : Yigang Guo et al. | |

It is certified that error appears in the above-identified patent and that said Letters Patent is hereby corrected as shown below:

On the Title page, item [54]: between "dual-edge" and "width", insert

-- PULSE --

On the Title Page:

The first or sole Notice should read --

Subject to any disclaimer, the term of this patent is extended or adjusted under 35 U.S.C. 154(b) by 1038 days.

On column 1, line 2 between "dual-edge" and "width", insert

-- PULSE --

On column 4, line 59, replace "1070A" with
-- 107A --

Signed and Sealed this

Twenty-first Day of September, 2010

David J. Kappos
*Director of the United States Patent and Trademark Office*